United States Patent [19]
Motose

[11] Patent Number: 6,007,392
[45] Date of Patent: Dec. 28, 1999

[54] EXHAUST TIMING VALVE CONTROL FOR WATERCRAFT ENGINE

[75] Inventor: Hitoshi Motose, Hamamatsu, Japan

[73] Assignee: Yamaha Hatsudoki Kabushiki kaisha, Iwata, Japan

[21] Appl. No.: 08/996,534

[22] Filed: Dec. 23, 1997

[30] Foreign Application Priority Data

Dec. 25, 1996 [JP] Japan ................................ 8-345142

[51] Int. Cl.⁶ .................................................. B63H 21/32
[52] U.S. Cl. ..................... 440/89; 123/65 PE; 123/323
[58] Field of Search ..................... 440/89; 123/65 PE, 123/323, 363, 373, 385

[56] References Cited

U.S. PATENT DOCUMENTS

| | | | |
|---|---|---|---|
| 4,285,311 | 8/1981 | Iio | 123/323 |
| 4,321,893 | 3/1982 | Yamamoto | 123/65 PE |
| 4,325,335 | 4/1982 | Shibata | 123/323 |
| 4,333,431 | 6/1982 | Iio et al. | 123/323 |
| 4,364,346 | 12/1982 | Shiohara | 123/323 |
| 4,368,703 | 1/1983 | Shibata | 123/323 |
| 4,397,272 | 8/1983 | Omote | 123/323 |
| 4,998,512 | 3/1991 | Masuda et al. | 123/65 PE |
| 5,000,131 | 3/1991 | Masuda | 123/65 PE |
| 5,063,887 | 11/1991 | Ozawa et al. | 123/65 PE |
| 5,063,888 | 11/1991 | Ozawa et al. | 123/65 PE |
| 5,220,890 | 6/1993 | Koriyama | 123/65 PE |
| 5,537,958 | 7/1996 | Nishimura et al. | 123/65 PE |
| 5,598,813 | 2/1997 | Masuda et al. | 123/65 PE |
| 5,605,119 | 2/1997 | Masuda et al. | 123/65 PE |
| 5,660,152 | 8/1997 | Masuda | 123/65 PE |

*Primary Examiner*—Jesus D. Sotelo
*Attorney, Agent, or Firm*—Knobbe, Martens, Olson & Bear LLP

[57] ABSTRACT

An exhaust timing valve control for an exhaust timing valve of an engine powering a watercraft is disclosed. The engine has an exhaust port leading from a combustion chamber for routing exhaust products therefrom and an exhaust timing valve cooperable with the exhaust port and movable between a first position for delaying the closing of the exhaust port and a second position for advancing the closing of the exhaust port. The engine includes a coil member providing a pulsed output when the engine is running. The exhaust timing valve control controls the position of the exhaust timing valve, the exhaust timing valve control including an engine speed detector which detects the speed of the engine based upon the output of the coil member.

9 Claims, 7 Drawing Sheets

EXHAUST TIMING VALVE CONTROL FOR WATERCRAFT ENGINE

FIELD OF THE INVENTION

The present invention relates to an exhaust timing valve of an internal combustion engine powering a water propulsion device of a watercraft. More particularly, the invention is a control for such an exhaust timing valve.

BACKGROUND OF THE INVENTION

Internal combustion engines include exhaust control mechanisms for controlling the flow of exhaust from each combustion chamber of the engine. In most instances, these mechanisms comprise valves.

In those instances where the engine operates on a two-stroke or two-cycle principal, the valve is often of the sliding or rotating type. Generally, this type of valve does not serve to ever completely close the opening or port in the combustion chamber wall or the exhaust passage. Instead, the valve moves between a first position in which the valve does not obstruct or obstructs very little of the exhaust port, and a second position in which the valve partly obstructs the port. Because the sliding or rotating type valve can partially obstruct the exhaust passage, it can be used to control the timing of the exhaust flow, and thus the performance or running conditions of the engine.

Generally, the position of the valve is arranged to be dependent upon engine speed. Thus, a crankshaft rotation sensor or crankcase pressure sensor is typically associated with the engine for providing engine speed data to an electronic control unit. The position of the valve is then controlled in accordance with the speed of the engine. These sensors, however, may suffer from accuracy and reliability problems. In addition, they increase the cost of the engine and render it more complex.

In accordance with the present invention, there is desired an improved control arrangement for controlling an exhaust timing valve.

SUMMARY OF THE INVENTION

In accordance with the present invention, there is provided a control for an exhaust timing valve of an engine.

Preferably, the engine is of the type including at least one combustion chamber having an exhaust port or passage leading therefrom for directing exhaust from the combustion chamber. The valve cooperates with the port to control the timing of the flow of exhaust from the combustion chamber. The valve is movable between a first position in which the valve is retracted and the exhaust flow timing is advanced, and a second position in which the valve is extended into the port and the exhaust flow timing is retarded.

The engine includes a coil member providing a pulsed output when the engine is running. The exhaust timing valve control controls the position of the exhaust timing valve, the exhaust timing valve control including means for detecting the speed of the engine based upon the pulsed output of the coil member.

In one embodiment of the invention, the coil member is associated with a generator which provides power when the engine is running. In another embodiment, the coil member is associated with a pulser coil which may also be used by an ignition control circuit for use in timing the firing of ignition elements.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is a control for an exhaust timing valve associated with an engine powering a watercraft, and more particularly, a personal watercraft. The exhaust timing valve control of the present invention is described for use in controlling an exhaust timing valve of an engine used in powering a personal watercraft since this is an application for which the control has particular utility. Those of skill in the art will appreciate that the control may be used in a variety of other applications.

Figure 1:
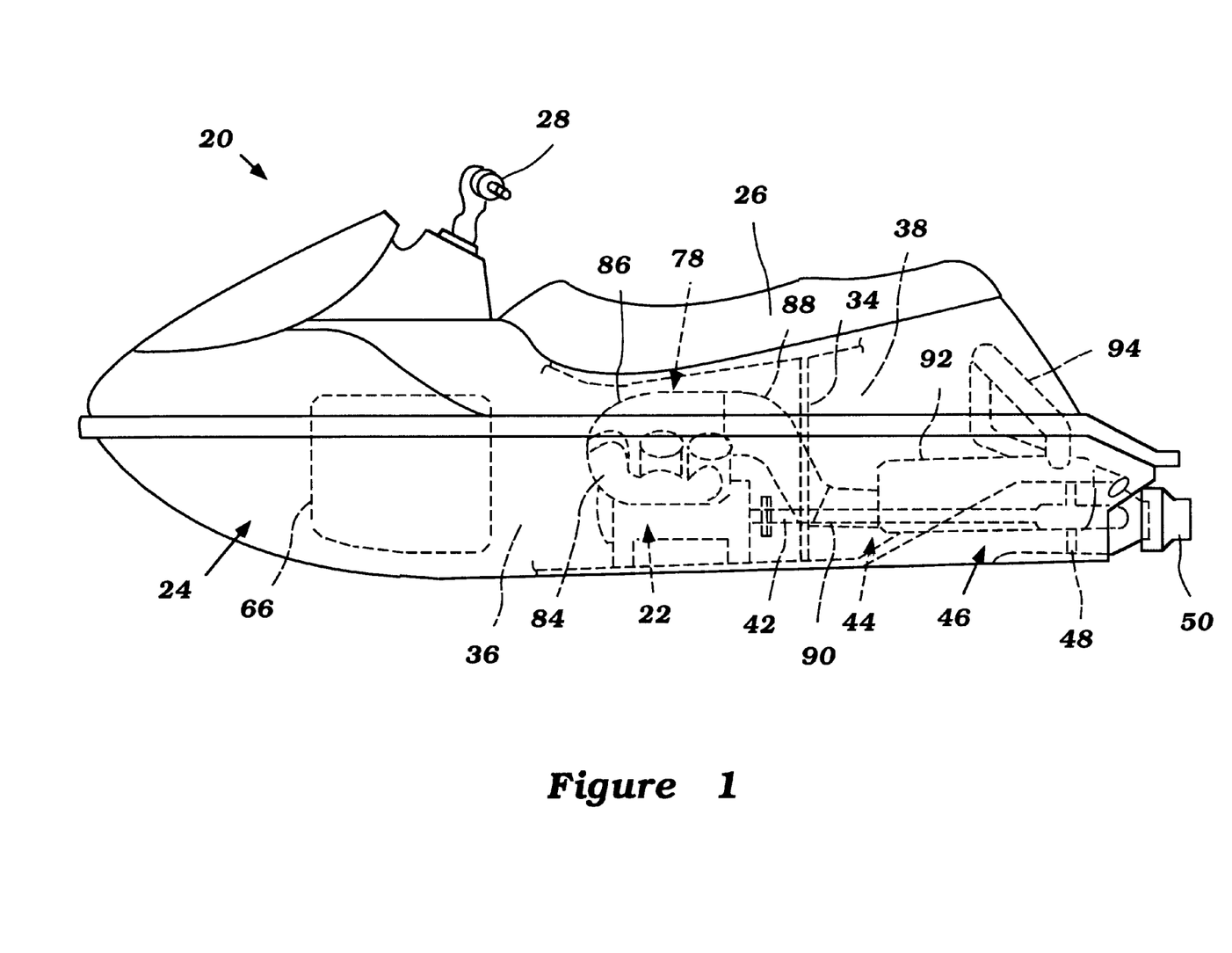
FIG. 1 is a side view of a personal watercraft of the type powered by an engine having an exhaust control in accordance with the present invention, the engine and other watercraft components positioned within the watercraft illustrated in phantom.
Figure 2:
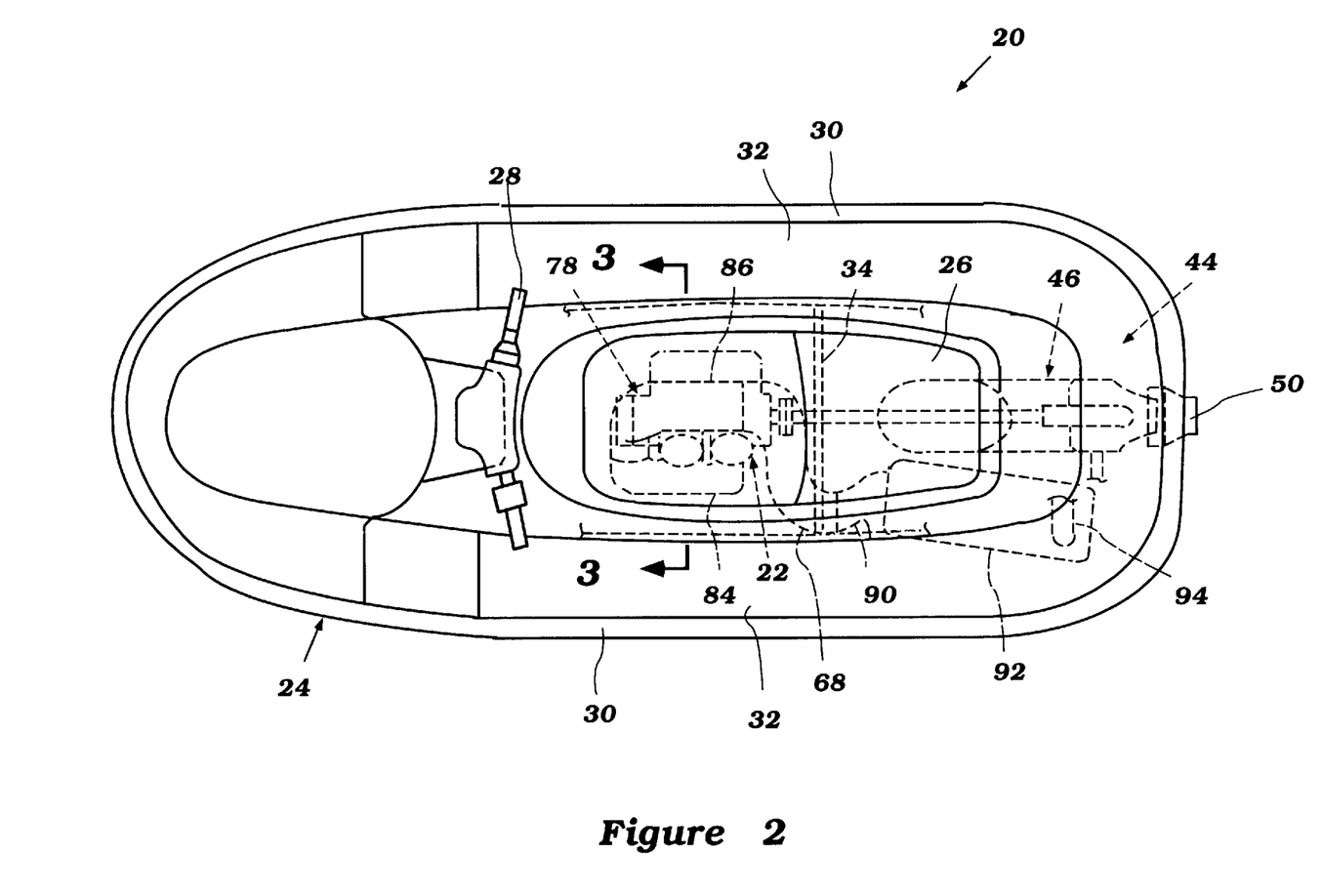
FIG. 2 is a top view of the watercraft illustrated in FIG. 1, with the engine and other watercraft components positioned within the watercraft illustrated in phantom.

FIGS. 1 and 2 illustrate a watercraft 20 having a hull 24. A seat 26 is positioned on a top portion of the hull 24. The seat 26 is preferably connected to a removable deck member. A steering mechanism 28 is provided adjacent the seat 26 for use by a user in directing the watercraft 20.

As best illustrated in FIG. 2, a bulwark 30 extends upwardly along each side of the watercraft 20. A foot step area 32 is defined between the seat 26 and its adjacent bulwark 30.

The hull 24, along with a bulkhead 34, defines an engine compartment 36 and a propulsion unit compartment 38. The engine 22 is positioned in the engine compartment 36. The engine 22 is preferably partially accessible through a maintenance opening accessible by removing the removable deck member on which the seat 26 is mounted.

The engine 22 has a crankshaft 40 (see FIG. 3) which is in driving relation with an impeller shaft 42. The impeller shaft 42 rotationally drives a means for propelling water of a propulsion unit 44. Referring to FIG. 1, the propulsion unit 44 is located in the propulsion unit compartment 38, and includes a propulsion passage 46 having an intake port which extends through the lower portion of the hull 24. The means for propelling water preferably comprises an impeller 48 positioned in the passage 46.

The impeller 48 draws water from the body of water in which the craft 20 is positioned into the intake port and expels it through an outlet at the stem or rear of the craft 20. Preferably, a nozzle 50 is movably mounted at the outlet for directing the water which is expelled therefrom. The nozzle 50 is linked to the steering mechanism 28, whereby the operator of the watercraft 20 may move the nozzle 50, directing the water expelled through the outlet, thus guiding the watercraft 20.

Figure 3:
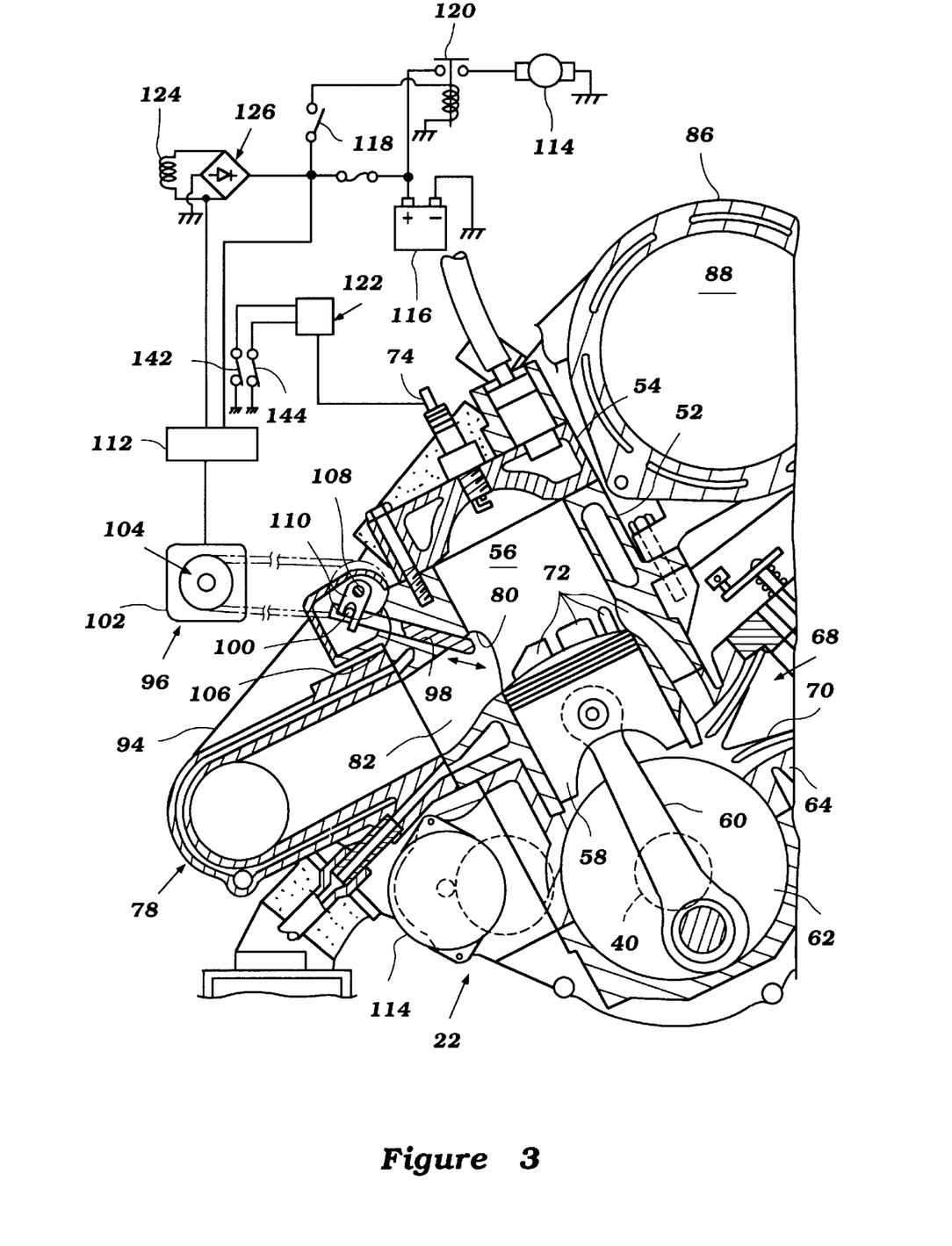
FIG. 3 is a cross-sectional view of the watercraft illustrated in FIG. 2, taken along line 3—3 therein and illustrating the engine along with several electrical system components.

The engine 22 is best illustrated in FIG. 3. As illustrated therein, the engine 22 is preferably of the two-cylinder, two-cycle variety. Of course, the engine 22 may have as few as one, or more than two, cylinders and operate in accordance with other operating cycles, as may be appreciated by one skilled in the art.

The engine 22 includes a cylinder block 52 having a cylinder head 54 connected thereto and cooperating therewith to define two cylinders 56. A combustion chamber is defined by a cylinder wall within the block 52, a recessed area in the cylinder head 54 and a top of a piston 58. The piston 58 is movably mounted in the cylinder 56 and connected to the crankshaft 40 via a connecting rod 60, as is well known in the art.

The crankshaft 40 is rotatably journaled by a number of sealed bearings with respect to the cylinder block 52 within a crankcase chamber 62. Preferably, the chamber 62 is defined by a crankcase cover member 64 which extends from a bottom portion of the cylinder block 52. The crankshaft 40 has pin portions extending between web portions with each connecting rod 60 connected to one of the pin portions.

As illustrated partly in FIG. 3, the engine 22 includes means for providing an air and fuel mixture to each cylinder 56. Preferably, an intake system is provided for delivering air for combustion to the engine. The intake system draws air from within the engine compartment 36 (the air entering the engine compartment through one or more air inlets in the hull 24) into a silencer (not shown) and delivered through a carburetor (not shown).

Fuel is provided to the incoming air. In particular, fuel is drawn from a fuel tank 66 (see FIG. 1) positioned in the engine compartment 36 by a fuel pump (not shown), and delivered through a fuel delivery line to the carburetor. A throttle valve (not shown) is preferably positioned along the intake path between the engine 22 and the carburetor for allowing the watercraft operator to control the rate of fuel and air delivery to the engine 22 for controlling the speed and power output of the engine via a throttle linkage. It is contemplated that the fuel may be provided by indirect or direct fuel injection, as well as via carburation, as known in the art.

The air and fuel mixture selectively passes through an intake port 68 into the crankcase chamber 62 as controlled by a reed valve 70, as is known in the art. As is also well known, an intake port 68 and corresponding reed valve 70 are preferably provided corresponding to each cylinder 56. The crankcase chamber 62 is compartmentalized so as to provide the crankcase compression feature for each combustion chamber, as is well known in the operation of two-cycle engines.

The fuel and air charge within the crankcase chamber 62 is delivered to each cylinder 56 through several scavenge passages 72 leading to a number of scavenge ports in the cylinder wall.

Figure 6:
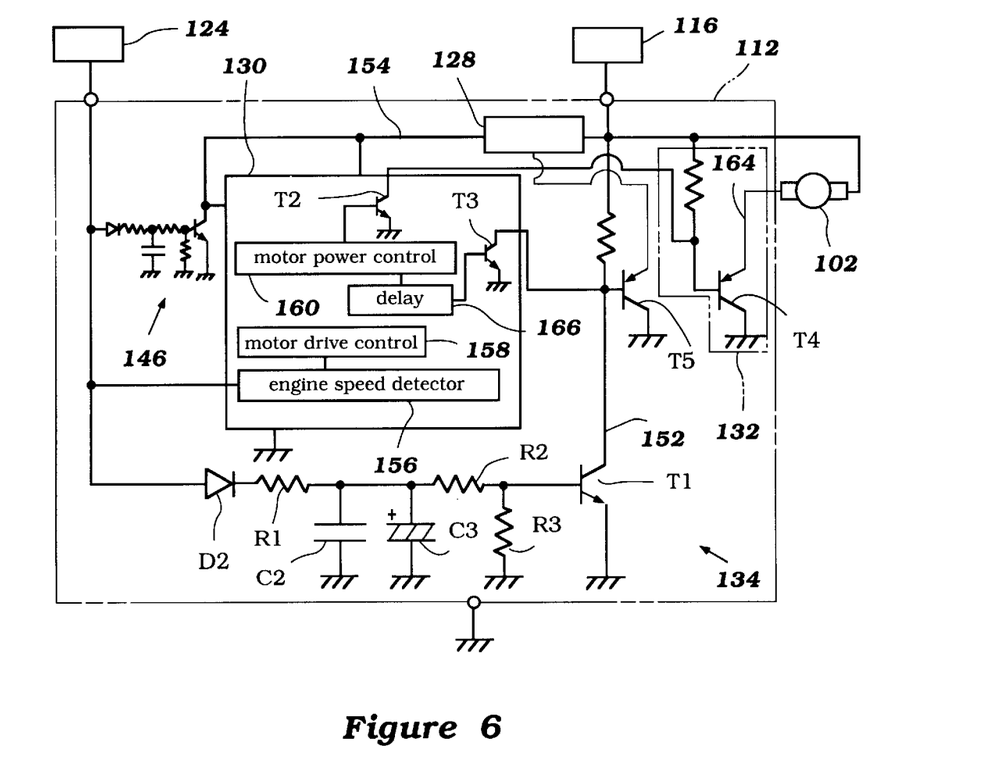
FIG. 6 is a circuit layout for the exhaust timing valve control illustrated in FIG. 5.

A suitable ignition system is provided for igniting the air and fuel mixture provided to each combustion chamber. Preferably, this system comprises a spark plug 74 (see FIG. 3) corresponding to each combustion chamber. An ignition system control 122 will be described with reference to FIGS. 3 and 7. As illustrated, a generator 124 or battery 116 (used at start-up), both of which are described in more detail below, selectively charges a capacitor C1. A main control 140 is used to turn the circuit 122 on and off. If either a stop switch 142 or a kill switch 144 are activated (i.e. closed), then the main control 140 prevents the flow of power from the generator 124 to the capacitor C1. If both switches 142,144 are open (i.e. as illustrated in FIG. 6), power may flow from the generator 124 to the capacitor C1.

Figure 7:
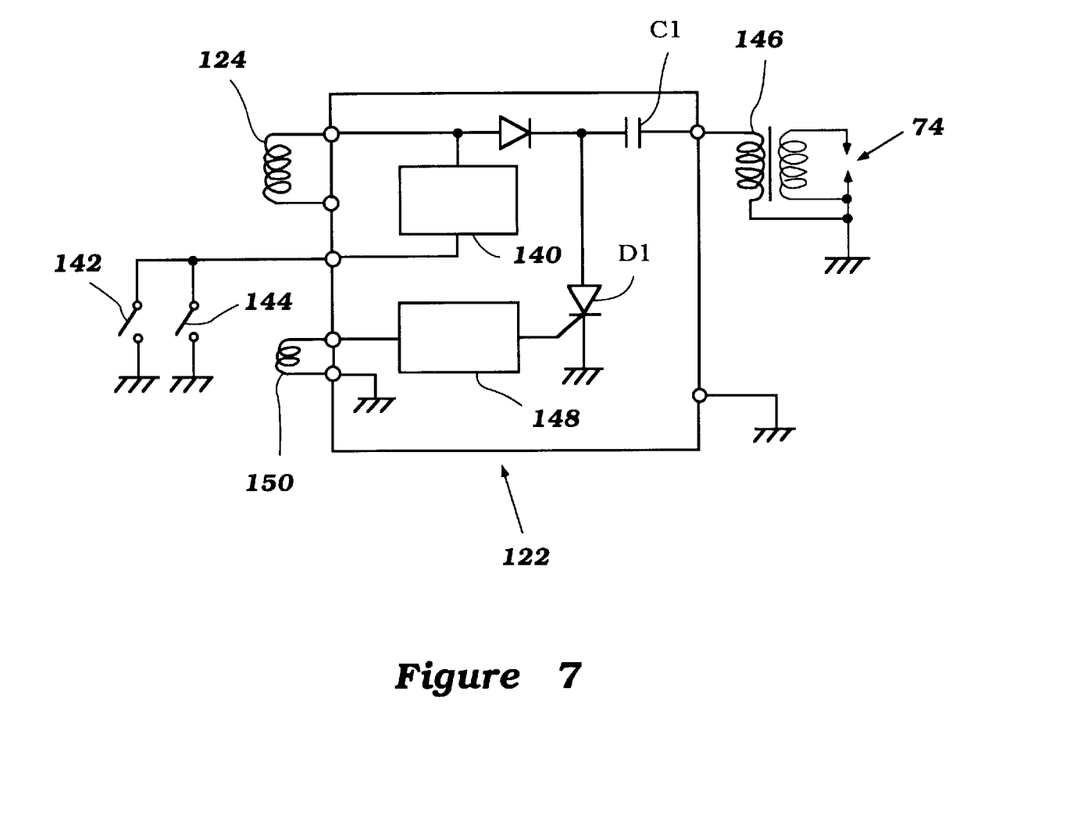
FIG. 7 is a circuit layout for an ignition control for use with an engine having the exhaust timing valve control of the present invention.

The capacitor C1 is arranged to selectively power an ignition coil 146. An ignition timing control 148 is provided for this purpose. Preferably, this timing control 148 receives timing data from a pulser coil 150 associated with the engine 22. The pulser coil 150 generates a pulse signal which controls the timing of the ignition firing by turning on and off a diode D1, thus controlling the capacitor C1. When current flows from the capacitor C1, it flows through the ignition coil 146, where the voltage is increased, and a spark is induced at the ignition element 74.

In this arrangement, a flywheel (not shown) may be connected to one end of the crankshaft 40. The flywheel preferably has a number of magnets thereon for use in the pulser-coil 150 arrangement for generating firing signals for the ignition system control 122. In addition, the generator 124 may be associated with magnets on the flywheel cooperating with a coil, or may comprise an entirely separate unit driven by the crankshaft 40, such as with a belt.

As illustrated in FIG. 3, the engine 22 preferably includes a starter motor 114. The starter motor 114 is electrically powered by the battery 116 when a starter switch 118 is closed, thus causing a starter relay 120 to close and permit power to flow to the motor 114. As described below, when the switch 118 is closed, the ignition system control 122 is preferably also powered for firing the ignition elements 74 in starting the engine.

The engine 22 is arranged with the stop and kill switches 142, 144, of types well known in the art, so that if either switch is "ON" or in its open condition, power is prevented from flowing to at least the ignition system control 122 for shutting down the engine 22.

The engine 22 may include a lubricating system which provides lubricating oil to the various moving parts thereof. Such a system may include an oil tank or reservoir (not shown) from which lubricating oil is delivered and circulated throughout the engine, including for mixing with the fuel which is supplied to the engine, as is well known to those skilled in the art.

The engine 22 also preferably includes a suitable cooling system. Preferably, the cooling system is a liquid cooling system which draws cooling water from the body of water in which the watercraft 20 is being operated and circulates it through various cooling water jackets in the cylinder block 52, head 54, and the like.

Exhaust gas generated by the engine 22 is routed from the engine to a point external to the watercraft 20 by an exhaust system 78 which includes an exhaust passage or port 80 in the cylinder wall. An exhaust passage 82 extends from the port 80 through the cylinder head 54. An exhaust manifold 84 is connected to a side of the engine 22. The manifold 84 has a pair of branches with passages leading therethrough aligned with the passages 82 leading through the cylinder head 54. This pair of passages in the manifold 84 merges into a single passage through the manifold 84.

After the branches of the manifold 84 merge, the manifold curves around the front end of the engine 22. An expansion pipe 86 is connected to the exhaust manifold 84, preferably via a flexible sleeve. The expansion pipe 86 has an enlarged passage or chamber 88 through which exhaust routed from merge passage in the exhaust manifold 84 flows. As illustrated in FIG. 3, the expansion pipe 86 preferably extends along the top of the engine 22 in the direction of the front to the rear of the watercraft 20.

A catalyst (not shown) may be positioned within the expansion pipe 86.

After flowing through the expansion pipe 86, the exhaust flows into an upper exhaust pipe section 88 of the exhaust system. This portion of the exhaust system is tapered to a smaller diameter from that of the expansion pipe 86. This exhaust pipe 88 leads to a water lock 92. The upper exhaust pipe 88 is preferably connected to the water lock 92 via a flexible fitting 90, such as a rubber sleeve. The exhaust flows through the water lock 92, which is preferably arranged as known to those skilled in the art to prevent the flow of water through the exhaust system towards the engine 22, and then passes to a lower exhaust pipe 94 arranged to discharge the exhaust into the body of water in which the watercraft 20 is operating.

Means are provided for controlling the timing of the flow of exhaust gases through each exhaust passage 82 from the cylinder 56. Preferably, this means comprises an exhaust timing control device 96. The exhaust timing control device 96 comprises a sliding knife-type valve 98 associated with each port 80 and means for moving the valve.

As illustrated in FIG. 3, the valve 98 has a generally flat or plate-like body having a first end positioned in the passage 82 at the exhaust port 80, and a pin 100 positioned at the other end. The valve 98 is arranged to move between a retracted position in which the valve 98 does not generally obscure the port 80, and an extended position in which the valve obscures a portion of the port 80. When in its retracted position, the valve 98 may said to be in an "advancing" position since the timing of the flow of exhaust from the cylinder occurs soon as the piston moves downwardly in the cylinder. On the other hand, when in the extended position, the valve 98 may be said to be in a "retarding" position, since the flow of exhaust from the cylinder is delayed since the piston must move farther down the cylinder before the passage 82 is opened.

While a variety of control strategies may be employed, it is common for the exhaust valve 98 to be positioned in its extended position when the engine speed is low, in the retracted position when the engine speed is high, and in some position between the retracted and extended positions at engine speeds between the low and high speeds.

The means for moving the valve 98 preferably comprises an electrically-powered stepper-type motor 102 arranged to move the pin 100 connected to the valve 98. As illustrated, a linkage links the motor 102 and the pin 100. The linkage preferably comprises a drive pulley 104 driven by the motor 102, a driven pulley 108 rotatably mounted to the engine 22 near the valve 98 by a pin 108, a drive element 110 extending between the pulleys 104,106 and a slotted drive element 110 connect to the driven pulley 108. The pin 100 of the valve 98 extends into the slot of the drive element 110, whereby rotation of the driven pulley 108 causes movement of the valve 98.

In the situation where the motor 102 is powered in only one direction, the valve 98 is preferably arranged to be biased, such as with a spring, to its fully open position. In that instance, the motor 102 is arranged to counteract the spring and move the valve 98 into a variety of positions between its fully open and fully closed positions.

In accordance with the present invention, an exhaust timing valve control 112 is provided for controlling the movement of the valve 98 via the motor 102 or other valve-driving mechanism. Preferably, this control 112 is arranged to control the movement of the valve 98 based on the speed of the engine as detected from either the pulser coil 150 or the generator 124 associated with the engine 22, as described in more detail below.

Once the engine 22 has been started by the motor 114, the switch 118 opens, turning off the starter motor 114. When running, the engine 22 powers a generator 124. The power from the generator 124 is rectified into a DC current by a rectifier 126. The power from the generator 124 as rectified is used to charge the battery 116, and therethrough power the various electrically operated engine features, including the exhaust timing valve control 112.

Figure 4:
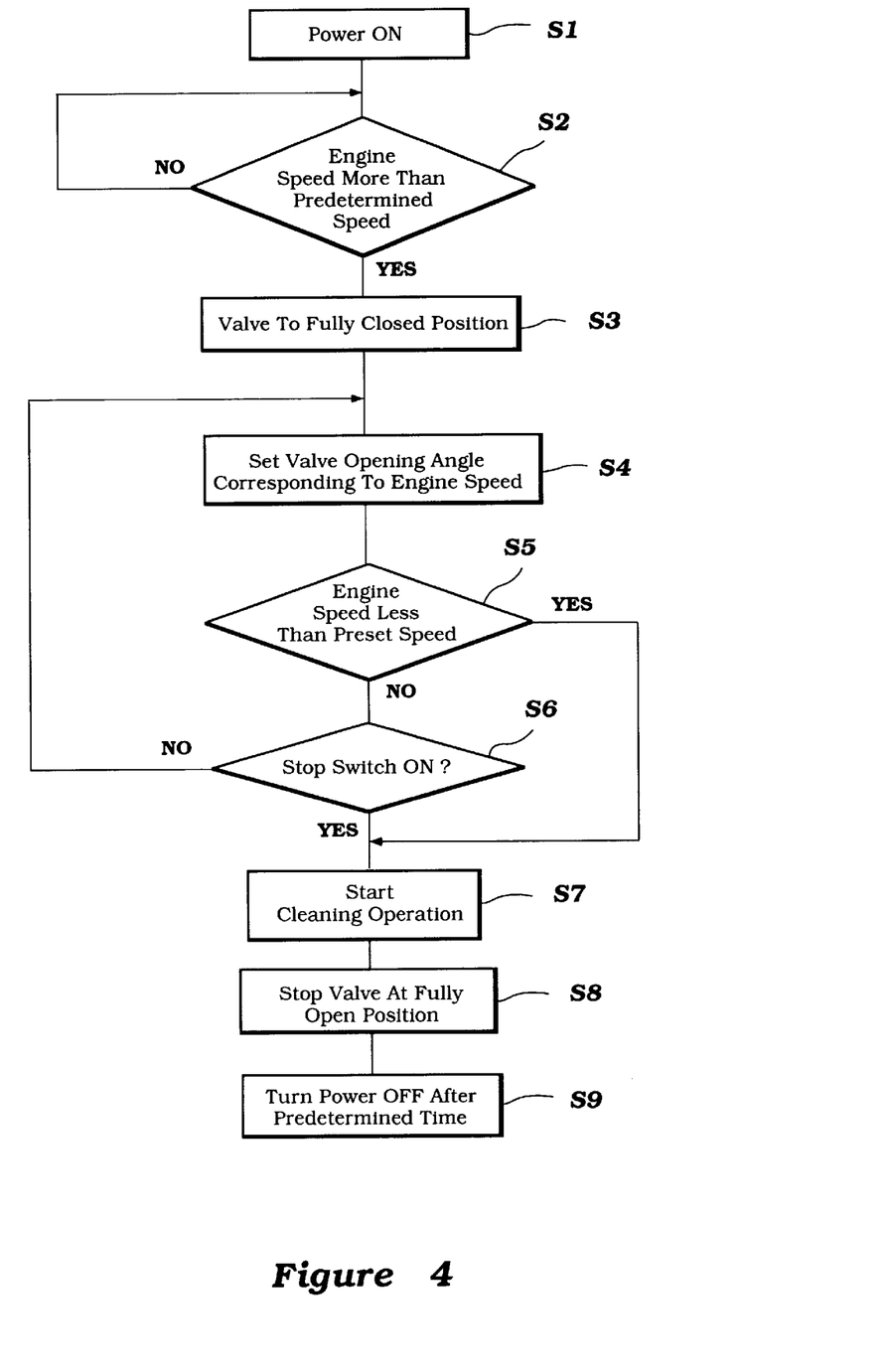
FIG. 4 is a flow diagram of an exhaust timing valve control strategy in accordance with the present invention.

The exhaust timing valve control 112 is preferably arranged to control the exhaust timing valve 98 in a manner illustrated in FIG. 4. As detail therein, the control 112 is arranged so that after the start switch 118 or other on/off switch is operated and power is provided (as described in more detail below) to the control 112 (step S1), the control 112 checks the engine speed (step S2). Once the engine speed exceeds a predetermined speed indicating that the engine is running, such as 700 rpm, the control 112 moves the valve 98 to its fully closed position (step S3).

The control 112 then monitors the engine speed and moves the valve 98 to a position which corresponds to a desired valve position for that given engine speed (step S4). The control 112 next checks to see if the engine speed has fallen below a preset or predetermined speed (step S5). If not, the control 112 checks to see if the stop switch 142 has been turned ON (i.e., moved to a position indicating stoppage of the engine) (step S6). If not, then the control 112 returns to step S4 to check the engine speed and sets the valve 98 to the appropriate position.

If the engine speed in step S5 is below the preset speed, or if the stop switch 142 is ON in step S6, then the control 112 moves to a step S7 in which the control operates the valve 98 in a cleaning operation, moving the exhaust valve 98 in and out. The control 112 then moves the valve 98 to its open position (step S8) and then turns the power off after a predetermined time (step S9).

Figure 5:
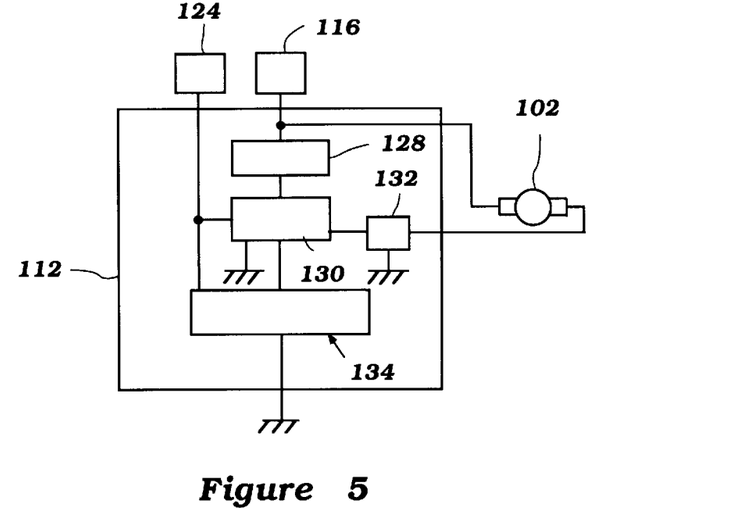
FIG. 5 is a schematic illustrating the exhaust timing valve control of the present invention.

FIG. 5 schematically illustrates the exhaust timing valve control 112 in more detail. As illustrated, the control 112 includes a power unit 128, a processing unit (CPU) 130, a motor driver 132, and a built-in circuit control 134.

FIG. 6 illustrates a preferred circuit arrangement for the exhaust timing valve control 112. As illustrated, the power unit 128 is arranged to selectively power the CPU 130 at a voltage (such as 5V) which is reduced from the voltage supplied by the electrical system (normally 12V).

The circuit control 134 is preferably arranged to turn on and off the control 112. In this preferred embodiment, the circuit control 134 is arranged to turn on an off the control 112 when power generated by the engine 22 via the generator 124 is sensed starting and stopping.

As illustrated, the circuit control 134 receives a voltage output from the generator 124, with current flowing through a diode D2 and then a resistor R1. The output then passes a noise-removing or high pass capacitor C2, selectively charges a charging capacitor C3 and then passes through a resistor R2 and then divides to a grounded resistor R3 and a transistor T1.

This circuit control 134 is arranged so that when a voltage is applied thereto when the engine 22 is started, the transistor T1 closes a main power circuit 152 to ground. This causes a transistor T5 to close, switching the power unit 128 to its ON position. At this time, the power unit 128 turns on, providing a current at reduced voltage to the CPU 130 through a CPU power circuit 154.

The output of the generator 124 is also transmitted to the CPU 130 through a wave-forming circuit 146 of a type known in the art. This circuit 146 is preferably arranged to shape the wave form into an ON/OFF type signal. The output of the generator 124 is monitored by an engine speed detection apparatus 156 of the CPU 130 which counts the pulses over time to determine the speed of the engine 22. This engine speed detector circuit 156 provides engine speed data to a motor drive control 158 which determines the desired position of the valve 98 at the engine speed and the necessary motor activation necessary to achieve the desired valve position (such as from an exhaust valve/engine speed map).

The motor drive control 158 sends appropriate signals to a motor power control 160 of the CPU 130. At the appropriate times, the power control 160 applies an activation voltage to a transistor T2, which in turn causes activation of a transistor T4 associated with the motor drive 132. When the transistor T4 closes, power flows from the battery 116 through a circuit 164 to the motor 102, powering the motor 102 and moving the valve 98 to its appropriate position.

It should be noted that the various component parts of the CPU 130 may be formed as an integrated circuit or chip as will be appreciated by those of skill in the art.

As the engine 22 continues to run, the CPU 130 continuously monitors the engine speed as determined by the pulses from the generator 124 and moves the valve 98 accordingly.

When either the engine 22 is shut off, such as with the stop or kill switches 142,144, the circuit control 134, no longer seeing the generated power, is arranged to shut of the control 112. In particular, when a voltage is no longer applied to the circuit control 134 from the generator 124 (which stops generating power when the engine stops running) an activation voltage is no longer applied to the transistor T1 after a period of time. When this occurs, the transistor T1 opens, which would normally cause the power unit 128 to shut off, thus shutting of the CPU 130 and thus the entire control 112.

In accordance with a preferred embodiment of the invention, however, after the engine 22 is shut off, the control 112 is preferably arranged to perform an exhaust timing valve cleaning control operation. To perform this function, the control 112 includes a delay mechanism 166 which is arranged as follows. When the CPU 130 is powered and the power control 160 is operating, it is arranged to send an appropriate signal to the delay mechanism 166 at spaced intervals. If the signal is received, the delay mechanism 166 applies an activation voltage to a transistor T3. When activated, the transistor T3 activates the transistor T5, maintaining the power circuit 128 on.

Thus, even when the engine 22 is stopped and the control circuit 134 shuts off, the power unit 128 still provides power to the CPU 130 for a short time because the delay mechanism 166 is activating the transistor T3 which is activating transistor T5. During this time, when the engine speed detector 156 indicates that the engine speed has fallen below a predetermine speed, the control 158 instructs the motor power control 160 to open and close the valve 98 in a cleaning operation by powering the motor 102. In this manner, the exhaust timing valve 98 is cleaned of deposits, reducing the probability of the valve 98 sticking.

At the same time, the motor power control 160 is arranged to not send a signal to the delay 166. Thus, after a short period of time, no activation voltage is applied to the transistor T3 by the delay mechanism 166 and the transistor T5 opens. This shuts off the power unit 128, stopping power from flowing to the CPU 130, and effectively shutting off the motor 102.

When the control 112 shuts off after the cleaning operation, the valve 98 is arranged, such as through spring biasing as described above, to move to its open position (as in step S8 in FIG. 4).

Advantageously, in this arrangement, the exhaust timing valve control 112 is arranged to detect the speed of the engine 22 based on the output of the generator 124, thus eliminating the need for an additional engine speed sensor. This makes reduces the complexity of the engine, eliminates the need to provide the sensor and an associated fitting of the engine and the like.

Figure 8:
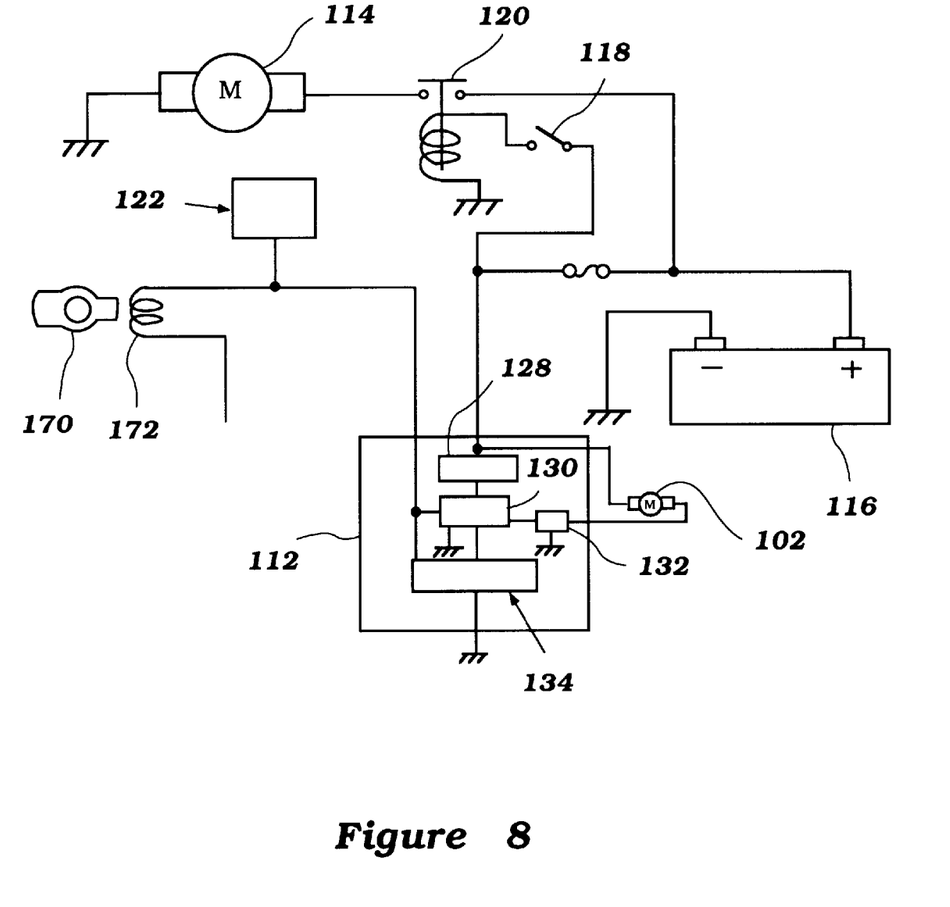
FIG. 8 is a circuit layout for an exhaust timing valve control in accordance with a second embodiment of the present invention.

FIG. 8 illustrates a circuit layout for an exhaust timing valve control 112 in accordance with a second embodiment of the invention. In this embodiment, the engine speed timing information is obtained from the pulser coil 150. As illustrated, this coil 150 comprises a rotor 170 driven by the crankshaft of the engine and associated with a coil 172. The pulser coil 150 generates data which, as described above, is used by the ignition circuit control 122 to control the timing of the ignition element firing.

In this embodiment, the output from the pulser coil 150 is utilized by the control circuit 134 of the exhaust timing valve control 112 to determine when the engine is started and stopped and thus for controlling the powering of the exhaust timing valve control 112. In addition, the output of the purser coil 150 is used by the exhaust valve timing control 112 to determine the engine speed for use in controlling the exhaust valve 98 in a manner described above.

While the control 112 has been described in conjunction with the control of a single exhaust timing control valve 98, the description is meant to apply to the similar control of each valve 98 associated with the engine 22.

Further, while the particular valve 98 which has been described is of the sliding knife-type valve, those of skill in the art will appreciate that the exhaust timing valve may comprise a rotating or other valve which provides the same or similar exhaust flow timing control.

Of course, the foregoing description is that of preferred embodiments of the invention, and various changes and modifications may be made without departing from the spirit and scope of the invention, as defined by the appended claims.

What is claimed is:

1. A watercraft having an engine powering a water propulsion unit, said engine having an exhaust port leading from a combustion chamber for routing exhaust products therefrom and an exhaust timing valve cooperable with said exhaust port and movable between a first position for delaying the closing of said exhaust portion and a second position for advancing the closing of said exhaust port, a coil member associated with said engine and providing a pulsed output when said engine is running, and an exhaust timing valve control for controlling the position of said exhaust timing valve, said exhaust timing valve control including means for detecting a speed of said engine based upon said output of said coil member.

2. The watercraft in accordance with claim 1, wherein said coil member is associated with a generator powered by said engine.

3. The watercraft in accordance with claim 1, wherein said coil member is associated with a pulser coil arrangement driven by said engine.

4. The watercraft in accordance with claim 1, wherein said exhaust timing valve comprises a sliding knife-type valve.

5. The watercraft in accordance with claim 1, wherein said control includes an electrically-powered motor arranged to move said exhaust timing valve.

6. A method of controlling an exhaust timing valve of an internal combustion engine, the engine having at least one combustion chamber, an intake passage leading to the at least one combustion chamber for providing air thereto, a fuel supply for supplying fuel to the combustion chamber, an exhaust port leading from the combustion chamber for routing exhaust products therefrom, the valve cooperable with the exhaust port and movable between a first position for delaying the closing of the exhaust port and a second position for advancing the closing of the exhaust port, the engine having a coil associated therewith, comprising the steps of starting said engine, generating a pulsed electric output with said coil, detecting a speed of the engine from the pulsed output of the coil, and moving the valve dependent upon the detected engine speed.

7. The method in accordance with claim 6, wherein said coil is associated with a generator powered by the engine and said step of detecting comprises the step of detecting a pulsed output from said generator.

8. The method in accordance with claim 6, wherein said coil is associated with an ignition circuit pulser coil arrangement and said step of detecting comprises the step of detecting a pulsed output from said pulser coil.

9. The method in accordance with claim 6, wherein said step of moving comprises the step of activating a motor coupled to said valve.

* * * * *